(12) United States Patent
Chiu et al.

(10) Patent No.: US 11,719,416 B2
(45) Date of Patent: Aug. 8, 2023

(54) DISPLAY DEVICE

(71) Applicants: Yujun Chiu, Tainan (TW); Raphael Lin, Tainan (TW)

(72) Inventors: Yujun Chiu, Tainan (TW); Raphael Lin, Tainan (TW)

(73) Assignee: Innolux Corporation, Miao-Li County (TW)

( * ) Notice: Subject to any disclaimer, the term of this patent is extended or adjusted under 35 U.S.C. 154(b) by 210 days.

(21) Appl. No.: 17/023,025

(22) Filed: Sep. 16, 2020

(65) Prior Publication Data

US 2022/0082231 A1 Mar. 17, 2022

(51) Int. Cl.
*F21V 15/04* (2006.01)
*F21V 7/04* (2006.01)

(52) U.S. Cl.
CPC ............... *F21V 15/04* (2013.01); *F21V 7/04* (2013.01)

(58) Field of Classification Search
CPC ....... F21V 15/04; F21V 7/04; G02F 1/133608
See application file for complete search history.

(56) References Cited

U.S. PATENT DOCUMENTS

2020/0400999 A1* 12/2020 Chang ............... G02F 1/133608

FOREIGN PATENT DOCUMENTS

TW 200909925 A 3/2009

* cited by examiner

*Primary Examiner* — Thomas M Sember
(74) *Attorney, Agent, or Firm* — Patterson + Sherdan, LLP

(57) ABSTRACT

A display device is provided, including a display panel and a backlight module for providing a light passing through the display panel. The backlight module includes a plurality of cushion elements, wherein at least portion of the plurality of cushion elements has a less deformation modulus than the display panel.

17 Claims, 8 Drawing Sheets

DISPLAY DEVICE

BACKGROUND OF THE DISCLOSURE

Field of the Disclosure

The application relates in general to a display device, and in particular to a display device that includes a display panel and a backlight module with cushion elements.

Description of the Related Art

Thanks to ongoing technological developments, recent display devices such as high-quality display screens usually include a plurality of LED (Light-emitting Diode) chips, which can provide 4K image quality, and the panel tends to be thinner. However, the thinner the display panel, the easier it is to be bent. When under the external force, it is easy to cause the optical films in the backlight module to be pressed and then the support member below the optical film is also pressed, which is easy to cause the top of the support member to bend or deformation, reducing the support ability. Therefore, how to provide an efficient support member in a display device is an important issue.

BRIEF SUMMARY OF DISCLOSURE

To address the deficiencies of conventional products, an embodiment of the disclosure provides a display device, A display device is provided, including a display panel and a backlight module for providing a light passing through the display panel. The backlight module comprises a plurality of cushion elements, wherein at least portion of the plurality of cushion elements has a less deformation modulus than the display panel.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSURE

Figure 1:
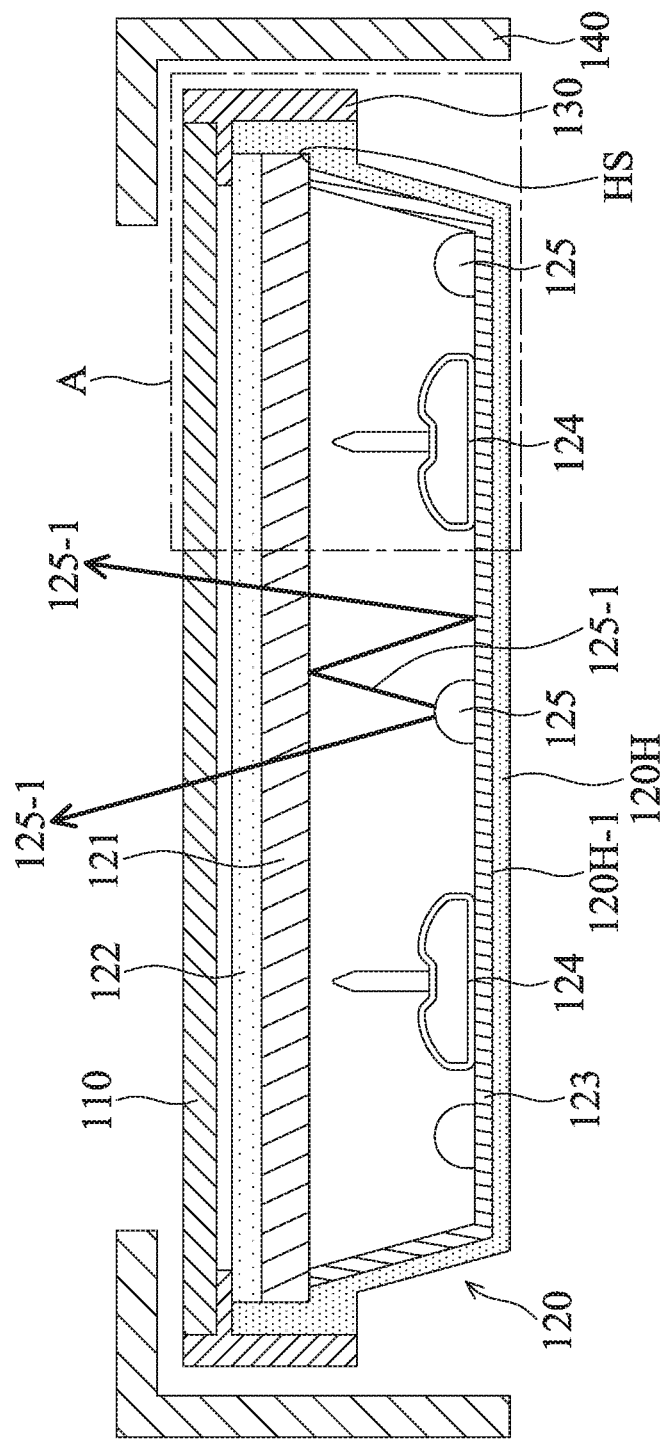
FIG. 1 is a schematic diagram of a display device according to an embodiment of the present disclosure.

The making and using of the embodiments of the methods of manufacturing an display device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise. Specific examples of components and arrangements are described below to simplify the present disclosure. These are, of course, merely examples and are not intended to be limiting. For example, the formation of a first feature disposed on a second feature in the description that follows may include embodiments in which the first and second features are formed in direct contact or directly on, and may also include embodiments in which additional features may be formed between the first and second features, such that the first and second features may not be in direct contact or indirectly on.

It should be noted that the disclosed electronic device may include, for example, a display device, an antenna device, a sensing device, a touch display device, a curved display device or a non-rectangular electronic device (free shape display), or may be bending or flexible tiling of electronic devices, but not limited to this. The electronic device may include, for example, a light emitting diode, liquid crystal, fluorescence, phosphor, quantum dot (QD), other suitable display dielectric, or a combination of the foregoing, but is not limit thereto. The light-emitting diode (LED) may include, for example, organic light-emitting diode (OLED), inorganic light-emitting diode, mini light-emitting diode (mini LED), micro light-emitting diode or quantum dot light-emitting diode (for example QLED, QDLED), other suitable materials or any combination of the above, but not limit thereto. The antenna device may be, for example, a liquid crystal antenna, but not limited thereto. It should be noted that the disclosed electronic device can be any combination of the foregoing arrangements, but it is not limited thereto. In addition, the appearance of the electronic device may be rectangular, circular, polygonal, a shape with curved edges, or other suitable shapes. The electronic device may have peripheral systems such as a driving system, a control system, a light source system, a shelf system, etc. to support the display device or the antenna device. It should be noted that the display device may be any combination of the foregoing, but is not limited thereto.

Referring to FIG. 1, FIG. 1 is a schematic diagram of a display device 100. The display device 100 comprises a display panel 110, a backlight module 120, a housing 130 and a frame 140. The housing 130 may serve as a support structure for the display panel 110, and the frame 140 serve as a protection for the display panel 110. The backlight module 120 may be disposed below the housing 130.

The display panel 110 may include a thin film transistor with a semiconductor material, the semiconductor material may include amorphous silicon, low temperature poly-silicon (LTPS) or metal oxide, or a combination of the above materials, the disclosure is not limited thereto. In some embodiments, different thin film transistors may have different semiconductor materials as described above. The thin film transistor may include at least one top, bottom or double gate electrode.

The display panel 110 is disposed on the backlight module 120, the display panel 110 may be configured to display an image. The backlight module 120 may be configured to provide sufficient brightness or substantially uniformly distributed of a light 125-1. In other words, the backlight module 120 may be used for providing the light 125-1 passing through the display panel 110. In some embodiments, the display panel 110 may comprise at least one substrate and at least one optical film disposed on the at least one substrate, the optical film which disposed on the at least one substrate may be a polarized film, but is not limited thereto. In some embodiments, the at least one optical film may be a polarized film and a phase retardation film.

The backlight module 120 may include a rear casing 120H, a first optical film 121, a second optical film 122, a reflector 123, a plurality of cushion elements 124, and a plurality of light sources 125. The rear casing 120H may be connected to the frame 140. In some embodiments, the rear casing 120H may have an accommodating space for accommodating the aforementioned elements (such as the first optical film 121, the second optical film 122, the reflector 123, the cushion elements 124, and the light sources 125). The first optical film 121 and second optical film 122 may comprise at least one diffusion layer. In other embodiment of the disclosure, the first optical film 121 may be disposed on the rear casing 120H. In particular, the first optical film 121 may be disposed on a sustain portion HS of the rear casing 120H. The reflector 123, the cushion elements 124 and the light sources 125 are disposed on an inner surface 120H-1 of the rear casing 120H. In particular, the reflector 123 disposed on the inner surface 120H-1 of the rear casing 120H, the light source 125 is disposed on the inner surface 120H-1 and passes through the reflector 123 (not shown). In particular, the light source 125 may include a light emitting unit and a light control element. The light emitting unit may be a chip for emitting at least one color, for example, the light emitting unit may emit one color of light, such as red light, or the light emitting unit may emit multiple colors of light, for example, red light, green light, and blue light, but the disclosure is not limited thereto. The light control element may be a lens for controlling a half-value angle of the light source 125. In some embodiments, the reflector 123 may be disposed adjacent to the light emitting unit. That is, the reflector 123 may surround the light emitting unit, and the light control element may pass through the reflector 123. The cushion elements 124 may be located between the inner surface 120H-1 and the first optical film 121 and/or second optical film 122.

Each light source 125 may be configured to provide the light 125-1, that is, the light 125-1 may be emitted from the light sources 125 and the light 125-1 may pass through the display panel 110. The cushion elements 124 of the backlight module 120 may be configured to support the display panel 110. The structure of the cushion elements 124 will be descripted in detail below.

Figure 2A:
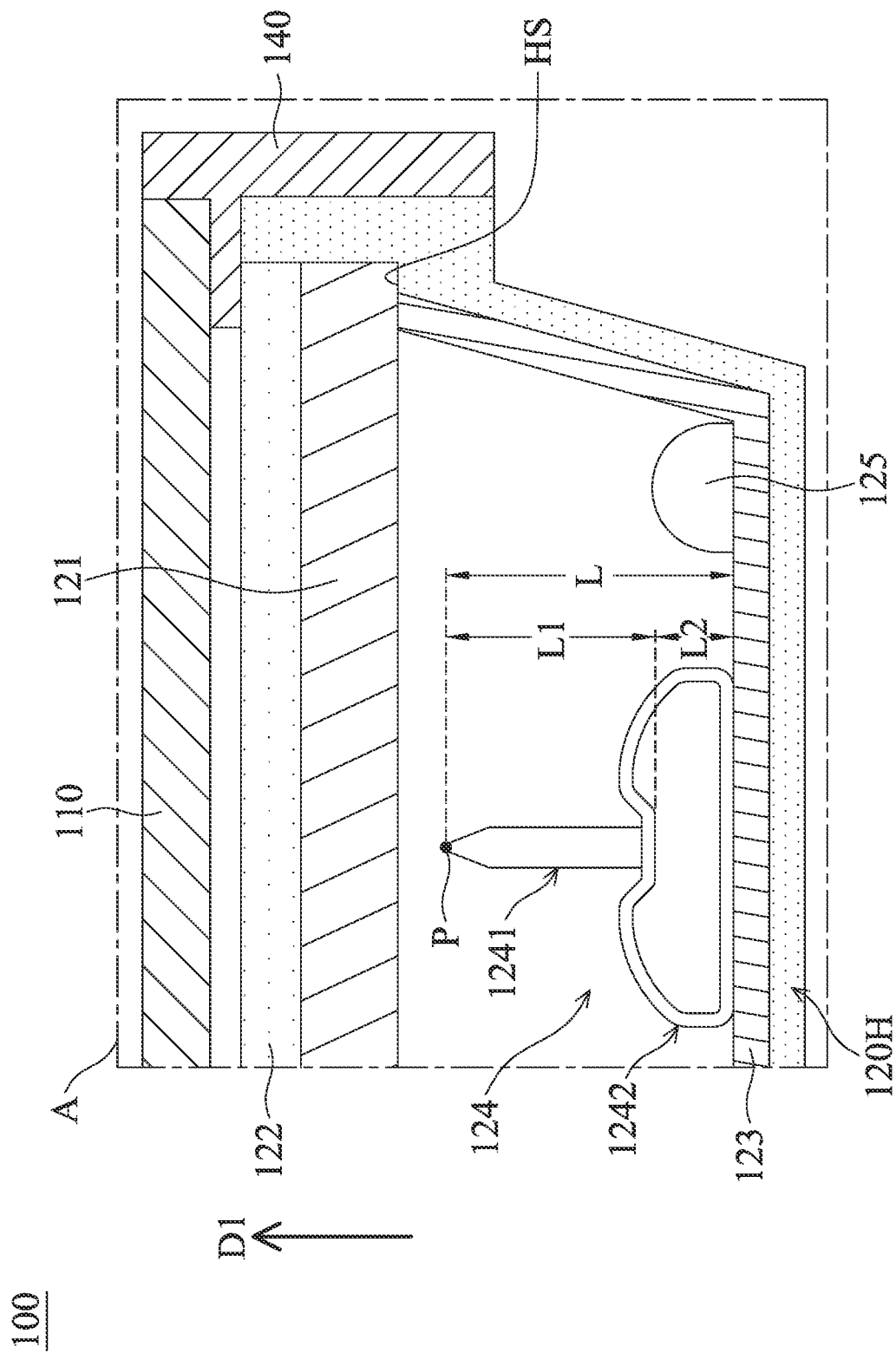
FIG. 2A is an enlarged schematic diagram of area A in FIG. 1.

Referring to FIG. 2A, which is an enlarged schematic diagram of area A in FIG. 1. FIG. 2A demonstrates one of the plurality of cushion elements 124, and the structures of another cushion elements 124 can refer to the cushion elements shown in FIG. 2A, for example. In one embodiment, the plurality of cushion elements 124 may be disposed on the rear casing 120H, and the cushion elements 124 may have an elongated structure extending toward the display panel 110. In some embodiments, the direction in which the cushion element 124 extends may be substantially parallel to a normal direction D1 of the display panel 110. In the disclosure, a total length L of the cushion element 124 is defined as the longest distance from a top P to the reflector 123. The cushion element 124 may be configured to support for the display panel 110, the first optical film 121, and the second optical film 122. When the display panel 110, the first optical film 121, and/or the second optical film 122 is/are squeezed toward the rear casing 120H by an external force, the cushion element 124 may be configured to provide a buffer for the display panel 110, the first optical film 121, and/or the second optical film 122.

The cushion element 124 may have a deformation modulus, which can be defined as:

$$\text{deformation modulus}(x) = \frac{\text{maximum or ultimate deformation force}(F)}{\text{maximum or ultimate deformation distance}(D)} \quad (1)$$

In the aforementioned formula (1), "the maximum or ultimate deformation force (F)" represents the maximum force which the cushion element 124 can withstand before being permanent deformed or broken; "the maximum or ultimate deformation distance (D)" represents the maximum deformation distance of the cushion element 124 before being permanent deformed or broken; and then "the deformation modulus" can be calculated by dividing the two. A unit of the ultimate deformation force (F) may be newton (Nt), kilogram-force (kgf), or gram-force (gf), but is not limited thereto. A unit of the ultimate deformation distance (D) may be centimeter (cm), or millimeter (mm), but is not limited thereto. For example, a unit of the deformation modulus may be kgf/mm, but is not limited thereto.

In some embodiments, testing a bearing force and a deformation distance of the cushion element 124 (or a load-displacement test for the cushion element 124) can be measured by an universal testing machine UT. The universal testing machine UT can be, for example, an "INSTRON 5534A" model. The universal testing machine UT may include a connecting rod UC, a pressure head UH and a test carrier TC. For convenience, FIG. 2B shows primary components of the universal testing machine UT (not all components of the universal testing machine UT being shown).

Figure 2B:
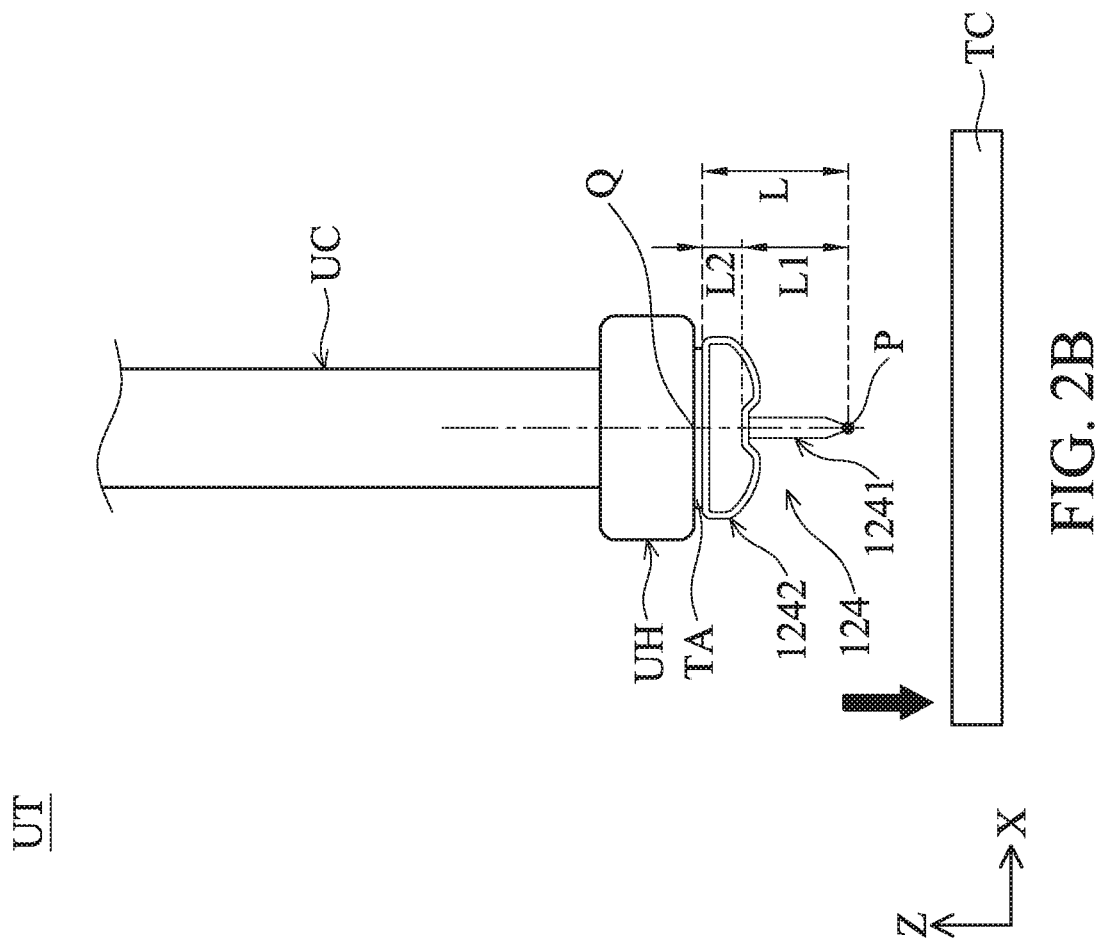
FIG. 2B is a schematic diagram of a pressure test for a cushion element by an universal testing machine.

For example, referring to FIG. 2B, put the cushion element 124 reversely attached to a pressure head UH of the universal testing machine UT with a double-sided tape TA; align the top P of the cushion element 124 with a center point Q of the pressure head UH, that is, in the Z direction, the top P of the cushion element 124 may be close to the center point Q of the pressure head UH; and then the universal testing machine UT performs a downward pressure test (for example, the pressure head UH moves along the −Z direction and drives the cushion element 124 being in contact with the test carrier TC; at this time, the cushion element 124 may be continue to compress and deform, and a load for the cushion element 124 may increase as the distance of the pressure head UH moves; when the cushion element 124 is permanently deformed, the pressing force may instantly decrease), and stops until the load of the cushion element 124 decreases by for example 10%, to obtain the ultimate deformation force (F) and the ultimate deformation distance (D) of the cushion element 124, so that the deformation modulus of the cushion element 124 can be calculated.

In some embodiments, the load-displacement test for the display panel 110 also can be measured by the universal testing machine. The universal testing machine performs a downward pressure test until the display panel 110 breaks (or the load is reduced by for example 10%) and then stops, to obtain the ultimate deformation force (F) and the ultimate deformation distance (D) of the display panel 110, so that the deformation modulus of the display panel 110 can be calculated.

Figure 2C:
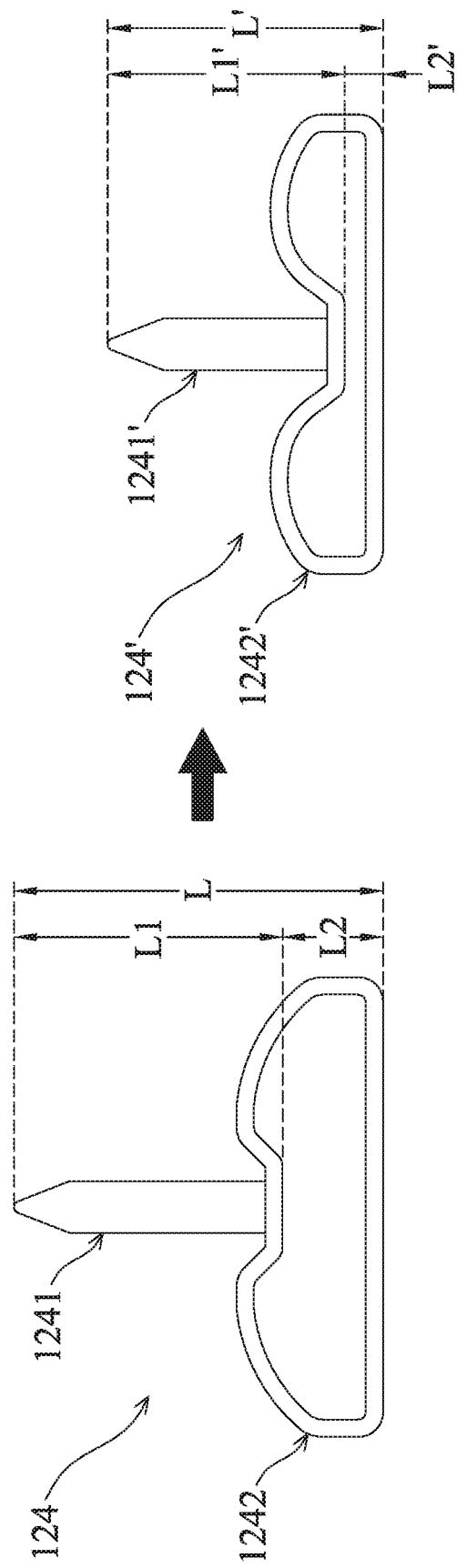
FIG. 2C is a schematic diagram of the uncompressed cushion element and the compressed cushion element.

Referring to FIG. 2C, which shows the deformed cushion element 124' in an ultimate deformation state. The ultimate deformation distance (D) may include a material deformation distance (in some embodiments, the material of the cushion element 124 can be, for example, polycarbonate (PC), polymethyl methacrylate (PMMA), etc. but is not limited thereto) and a structure displacement distance which are respectively corresponding to a support portion 1241 which may have an original length L1 and a base portion 1242 which may have an original length L2. When the cushion element 124 may be pressed by the first optical film 121, a compression deformation on the cushion element 124 may be caused, and the total length L of the cushion element 124 is decreased, such as a deformed total length L1' of a deformed support portion 1241' of the deformed cushion element 124', wherein the ultimate deformation distance (D) may include the material deformation distance (the original length L1–the deformed length L1') and the structure displacement distance (the original length L2–a compression length L2'), such as (D)=(L1–L1')+(L2–L2'). The compression length L2' may be the shortest length of a deformed base portion 1242' of the deformed cushion element 124'.

FIGS. 3A to 3D show the cushion elements (124, 124b, 124c, and 124d) in different embodiments.

Figures 3A, 3B:
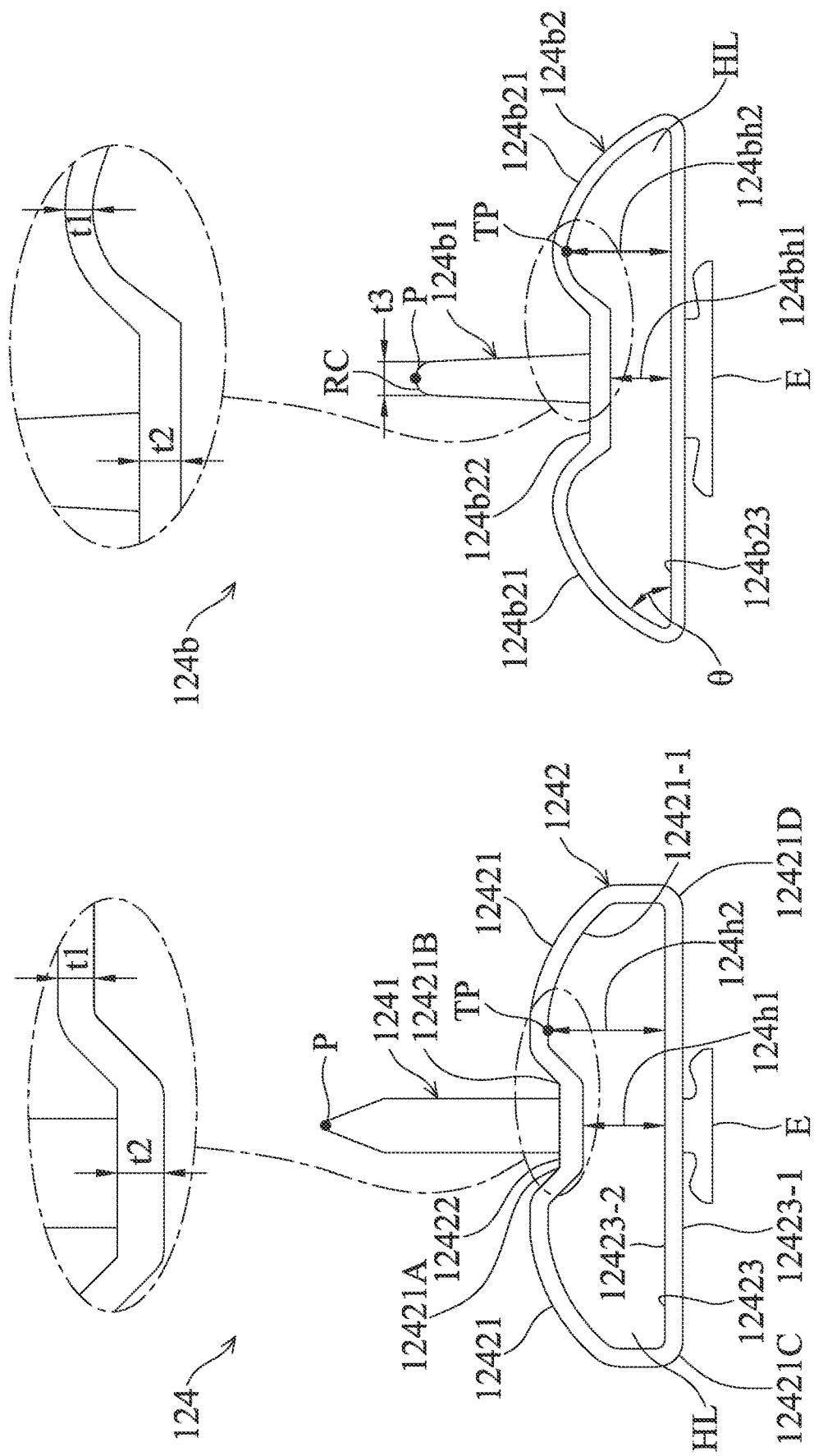
FIG. 3A is a schematic diagram of a cushion element according to an embodiment of the present disclosure.
FIG. 3B is a schematic diagram of a cushion element according to an embodiment of the present disclosure.

As shown in FIG. 3A, the cushion element 124 has the support portion 1241 and the base portion 1242, wherein the support portion 1241 may be connected to the base portion 1242. In some embodiments, the support portion 1241 may be disposed on the base portion 1242. The support portion 1241 may have the elongated structure extending toward the display panel 110. In some embodiments, as shown in FIG. 2A, the direction in which the support portion 1241 extends is the normal direction D1 of the display panel 110. The base portion 1242 may have a hollow region HL. In this embodiment, the base portion 1242 has two (but is not limited thereto) convex structures 12421, a connecting part 12422 and a bottom part 12423, wherein the two convex structures 12421 may be respectively located on both sides of the support portion 1241, one side of the two convex structures 12421 (for example, a side 12421A and a side 12421B) may be connected by the connecting part 12422, the bottom part 12423 may be disposed opposite to the connecting part 12422 and may be connected to the other side of the two convex structures 12421 (for example, a side 12421C and a side 12421D), and the two convex structures 12421 may be disposed between the connecting part 12422 and the bottom part 12423. In some embodiments, a shortest distance 124h1 from the connecting part 12422 to the bottom part 12423 may be greater than or equal to 4 mm and less than or equal to 7 mm; a shortest distance 124h2 from a vertex TP (the definition of vertex TP: the point farthest from the inner surface (for example, the surface 12423-2) of the bottom part 12423 on the inner surface (for example, the surface 12421-1 closest to the bottom part 12423) of the convex structure 12421 in the normal direction of the display panel 110) of the convex structure 12421 to the bottom part 12423 may be greater than or equal to 8 mm and less than or equal to 10.5 mm. In the normal direction D1 of the display panel 110, the location of the vertex TP of each convex structure 12421 may be higher than the location of the connecting part 12422. In other words, in the normal direction D1 of the display panel 110, the shortest distance 124h2 from the vertex TP of each convex structure 12421 to the bottom part 12423 is great than the shortest distance 124h1 from the connecting part 12422 to the bottom part 12423, that is, the length of the shortest distance 124h2 is longer than the length of the shortest distance 124h1. In some embodiments, a ratio of the shortest distance 124h1 to the shortest distance 124h2 may be greater than or equal to 0.7 and less than or equal to 1, so that the external force which the support portion 1241 bears may be decreased or the support ability may be increased.

The thickness t2 of the connecting part 12422 may be larger than the thickness t1 of the convex structure 12421. In some situations, when the thickness t2 is less than the thickness t1, the support from the support portion 1241 may be insufficient; and the cushion element 124 may be easy to break due to the convex structure 12421 too thick. In some embodiments, the thickness t1 of the convex structure 12421 may be greater than or equal to 0.5 mm and less than or equal to 2 mm, and the thickness t2 of the connecting part 12422 may be greater than or equal to 0.5 mm and less than or equal to 2.5 mm. In another embodiment, the thickness t1 may be equal to 1.08 mm, and the thickness t2 may be equal to 1.25 mm, but not limit thereto.

Furthermore, in some embodiments, as shown in FIG. 2A and FIG. 3A, the cushion element 124 may further comprise an engaging portion E which may be disposed on the outer surface 12423-1 of the bottom part 12423. The engaging portion E is configured to connect to or engage with the rear casing 120H or the reflector 123, so that the cushion element 124 may be more fixed.

FIG. 3B shows the cushion element 124b according to another embodiment in the disclosure. The support portion 124b1 of the cushion element 124b may have a rounded corner RC on the top of the support portion 124b1. In some embodiments, a width t3 of the rounded corner RC may be less than 0.5 mm. In some embodiments, the width t3 may be measured with a vernier caliper. If the rounded corner RC is too large, it is easy to cause abnormal optical grade, such as causing halo phenomenon or abnormal optical path. If the rounded corner RC is too small, the top of the cushion element 124 may be easy to bend, and the supporting force may be insufficient.

The shortest distance 124bh1 from the connecting part 124b22 to the bottom part 124b23 may be greater than or equal to 3 mm, and less than or equal to 6 mm; the shortest distance 124bh2 from the vertex TP of the convex structure 124b21 to the bottom part 124b23 may be greater than or equal to 4 mm, and less than or equal to 7 mm. There is an angle θ between the convex structure 124b21 and a bottom part 124b23 of the base portion 124b2 is greater than or equal to 30 degrees, and less than or equal to 60 degrees.

In some embodiments, the thickness t1 of the convex structure 124b21 may be greater than or equal to 0.5 mm, and less than or equal to 2.5 mm, and the thickness t2 of the connecting part 124b22 may be greater than or equal to 0.5 mm, and less than or equal to 3 mm. In another embodiment, the thickness t1 may be equal to 1.05 mm, and the thickness t2 may be equal to 1.22 mm, but is not limited thereto. If the thicknesses t1 and t2 are too thick, there may be no buffering capacity, and the cushion element 124b may easily be broken when the external force is increased. If the thicknesses t1 and t2 are too thin, the cushion element 124b may have no support function, and it may be easy to cause the support portion 124b1 to break easily.

Figures 3C, 3D:
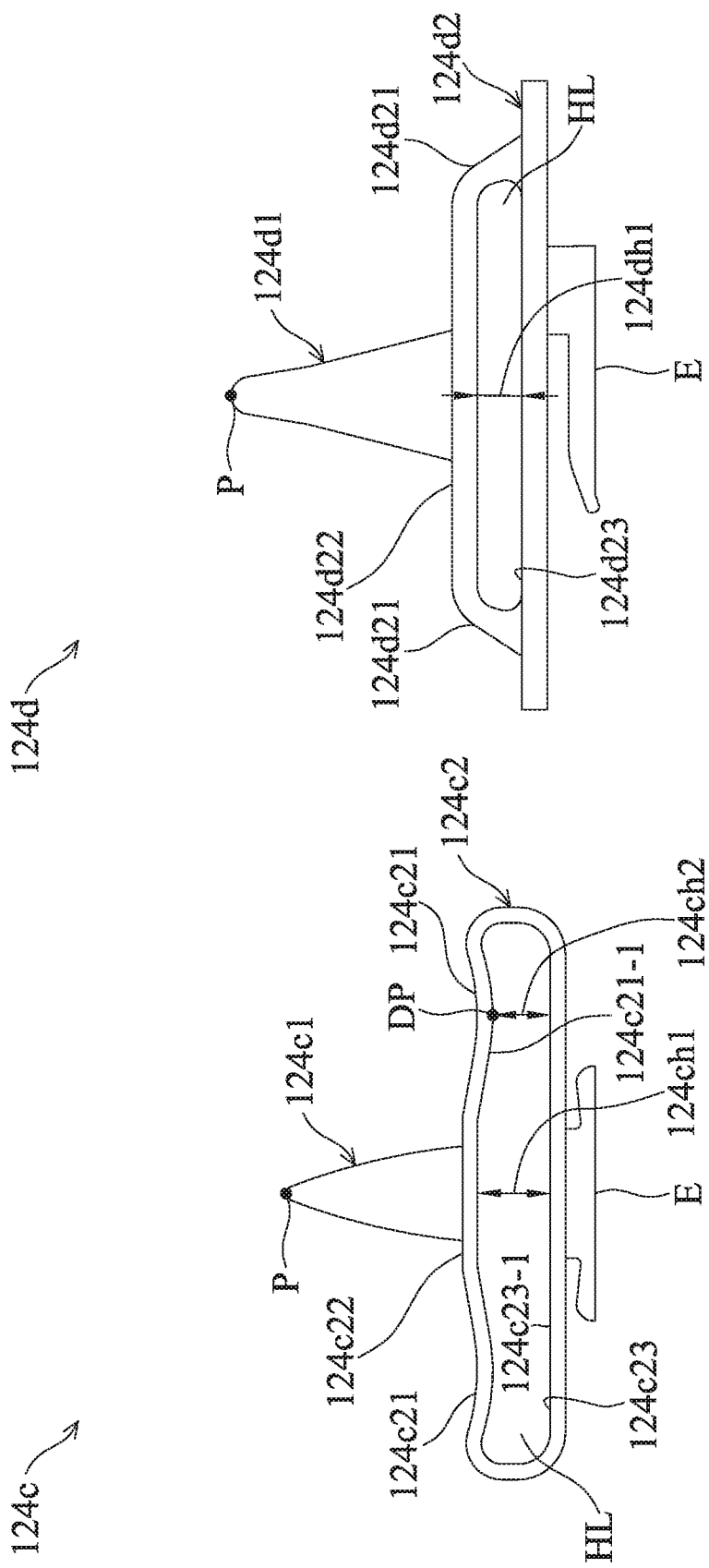
FIG. 3C is a schematic diagram of a cushion element according to an embodiment of the present disclosure.
FIG. 3D is a schematic diagram of a cushion element according to an embodiment of the present disclosure.

FIG. 3C shows a cushion element 124c according to another embodiment in the disclosure. A support portion 124c1 of the cushion element 124c may have a cone structure. A base portion 124c2 may include a connecting part 124c22, a bottom part 124c23 disposed opposite to the connecting part 124c22, and two (but not limit thereto) concave structures 124c21 located on both sides of the support portion 124c1 of the cushion element 124c. A connecting part 124c22 may connect to one side of the two convex structures 124c21. In some embodiments, the bottom part 124c23 can be connected to the other side of the two convex structures 124c21. In the normal direction D1 of the display panel 110 (as shown in FIG. 2A), the location of a vertex DP (the definition of vertex DP: the closest point to the inner surface (for example, surface 124c23-1) of the bottom part 124c23 on the inner surface (for example, the surface 124c21-1 closest to bottom part 124c23) of the concave structure 124c21 in the normal direction of display panel 110) of each concave structure 124c21 is lower than the location of the connecting part 124c22. In some embodiments, the shortest distance 124ch1 from the connecting part 124c22 to the bottom part 124c23 may be 4 mm to 10 mm; the shortest distance 124ch2 from the vertex TP of the concave structure 124c21 to the bottom part 124c23 may be 2 mm to 7 mm. In another embodiment, the shortest distance 124ch1 may be equal to 7 mm, and short distance 124ch2 may be equal to 4.5 mm, but it is not limited thereto.

FIG. 3D shows a cushion element 124d according to another embodiment in the disclosure. A support portion 124d1 of the cushion element 124d may have the cone structure, and a base portion 124d2 of the cushion element 124d may have a tapered shape, and the base portion 124d2 may include two (but not limited thereto) bending structures 124d21, a connecting part 124d22, and a bottom part 124d23. The connecting part 124d22 and the bottom part 124d23 may connect the two bending structures 124d21. In some embodiments, the shortest distance 124dh1 from the connecting part 124d22 to the bottom part 124d23 may be greater than or equal to 0.5 mm, and less than or equal to 2.5 mm. For example, the shortest distance 124dh1 may be equal to 1.2 mm, but is not limited thereto.

Figure 4:
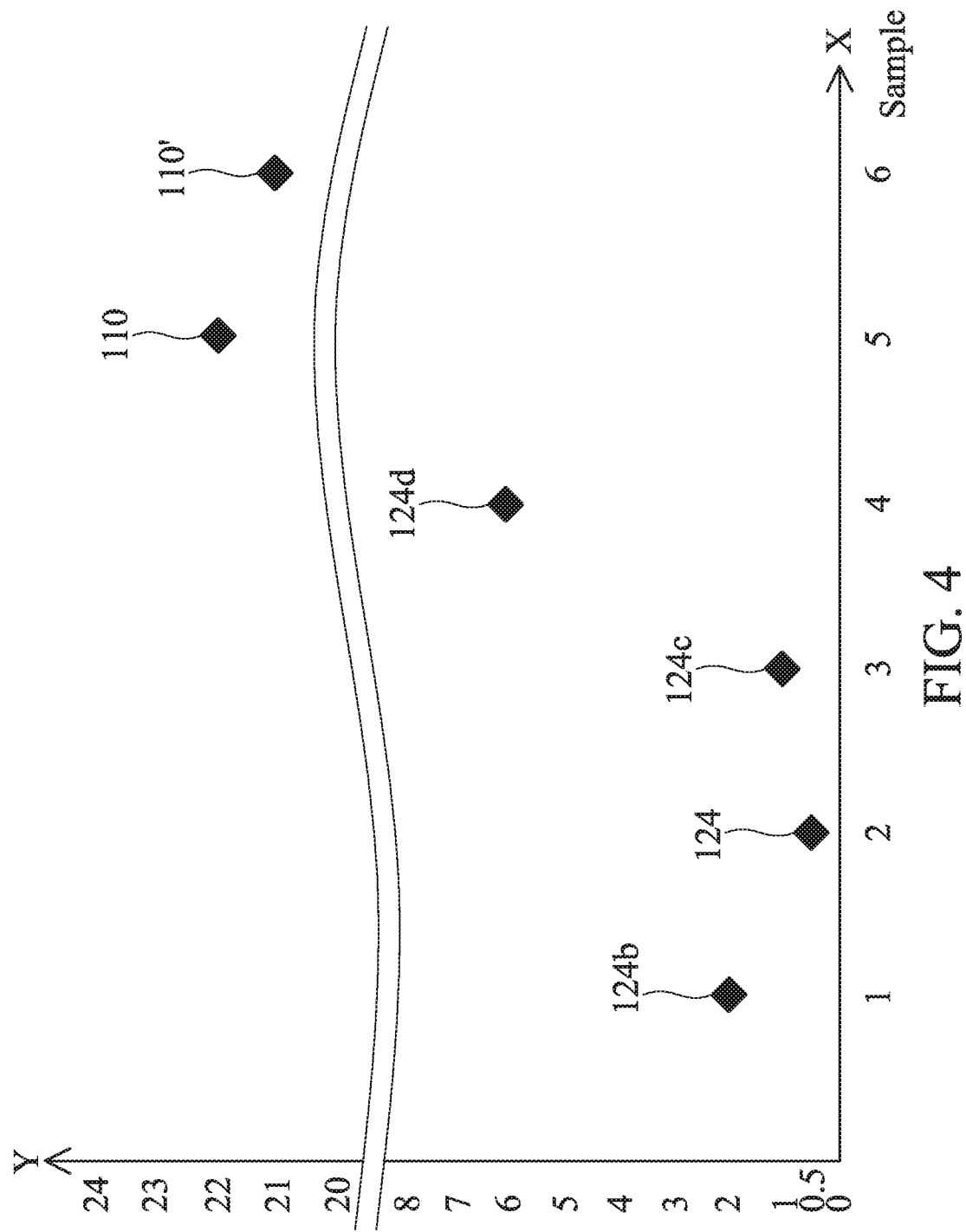
FIG. 4 is a schematic diagram of deformation modulus values of a plurality of samples.

FIG. 4 shows the deformation modulus values of each cushion element (124, 124b, 124c, and 124d), the display panel 110 and another display panel 110'. The X-axis represents the number of the sample for testing deformation modulus, and the Y-axis represents the deformation modulus for each sample, including cushion elements 124, 124b, 124c, 124d and display panel 110, 110'. In some embodiments, the deformation modulus of the cushion element is not higher than 8 kgf/mm; and the deformation modulus of the display panel 110 and/or the display panel 110' may be higher than 20 kgf/mm and less than 24 kgf/mm. For example, the deformation modulus of the display panel 110 may be equal to 22.18 kgf/mm, or the deformation modulus of the display panel 110' may be equal to 21.02 kgf/mm, but not limited thereto.

At least portion of the plurality of cushion elements (for example, the cushion elements 124, 124b, 124c, or 124d or combination thereof) may have a less deformation modulus than the display panel 110 and/or the display panel 110'. Especially, the deformation modulus of each of the at least portion of the plurality of cushion elements may be not higher than a half of the deformation modulus of the display panel 110 and/or the display panel 110'. In some embodiment, the plurality of cushion elements (for example the cushion elements 124, 124b, 124c, or 124d or combination thereof) each may have a less deformation modulus than the display panel 110 and/or the display panel 110'. Especially, the deformation modulus of each of the plurality of cushion elements may be not higher than a half of the deformation modulus of the display panel 110 and/or the display panel 110'. In another embodiment, the plurality of cushion elements (for example the cushion elements 124, 124b, 124c, or 124d or combination thereof) each may have a deformation modulus not less than 0.5 kgf/mm and not higher than 8 kgf/mm. That is to say, the plurality of cushion elements each may have a deformation modulus, and the deformation modulus is greater than or equal to 0.5 kgf/mm, and less than or equal to 8 kgf/mm. For example, as show in FIG. 4, a deformation modulus of the plurality of cushion elements 124 may be greater than or equal to 0.3 kgf/mm and less than or equal to 1.5 kgf/mm. In one embodiment, the deformation modulus of the plurality of cushion elements 124 may be equal to 0.71 kgf/mm, but is not limited thereto. In other embodiments, a deformation modulus of the plurality of cushion elements 124b may be greater than or equal to 1.5 kgf/mm and less than or equal to 3.5 kgf/mm. In one embodiment, the deformation modulus of the plurality of cushion elements 124b may be equal to 2.22 kgf/mm, but is not limited thereto. In some embodiments, a deformation modulus of the plurality of cushion elements 124c may be greater than or equal to 0.5 kgf/mm and less than or equal to 2 kgf/mm. In one embodiment, the deformation modulus of the plurality of cushion elements 124c may be equal to 1.03 kgf/mm, but is not limited thereto. In another embodiment, a deformation modulus of the plurality of cushion elements 124d may be greater than or equal to 3 kgf/mm and less than or equal to 10 kgf/mm. For example, the deformation modulus of the plurality of cushion elements 124d may be equal to 6.18 kgf/mm, but is not limited thereto.

In this embodiment, the display panel 110 or the display panel 110' may include at least one of substrate, for example the at least one of substrate may be a glass substrate and a thickness of the at least one of substrate may be greater than or equal to 0.3 mm and less than or equal to 2 mm. For instance, the display panel 110 may include two substrates, and the thickness of each of the two substrates may be equal to 0.7 mm. For another example, the display panel 110' may include two substrates, and the thickness of each of the two substrates may be equal to 0.5 mm, but is not limited thereto. The aforementioned "equal to" can include a range with +/−5% measurement error.

Under the same force being applied, the smaller the deformation modulus of the cushion elements (for example the cushion elements 124, 124b, 124c, or 124d or combination thereof), the greater the support ability for the display panel 110 or the display panel 110'. Therefore, the cushion element, for example the cushion element 124 may be not easily deformed or broken permanently to cause the display panel 110 and/or the display panel 110' being damaged.

Figure 5:
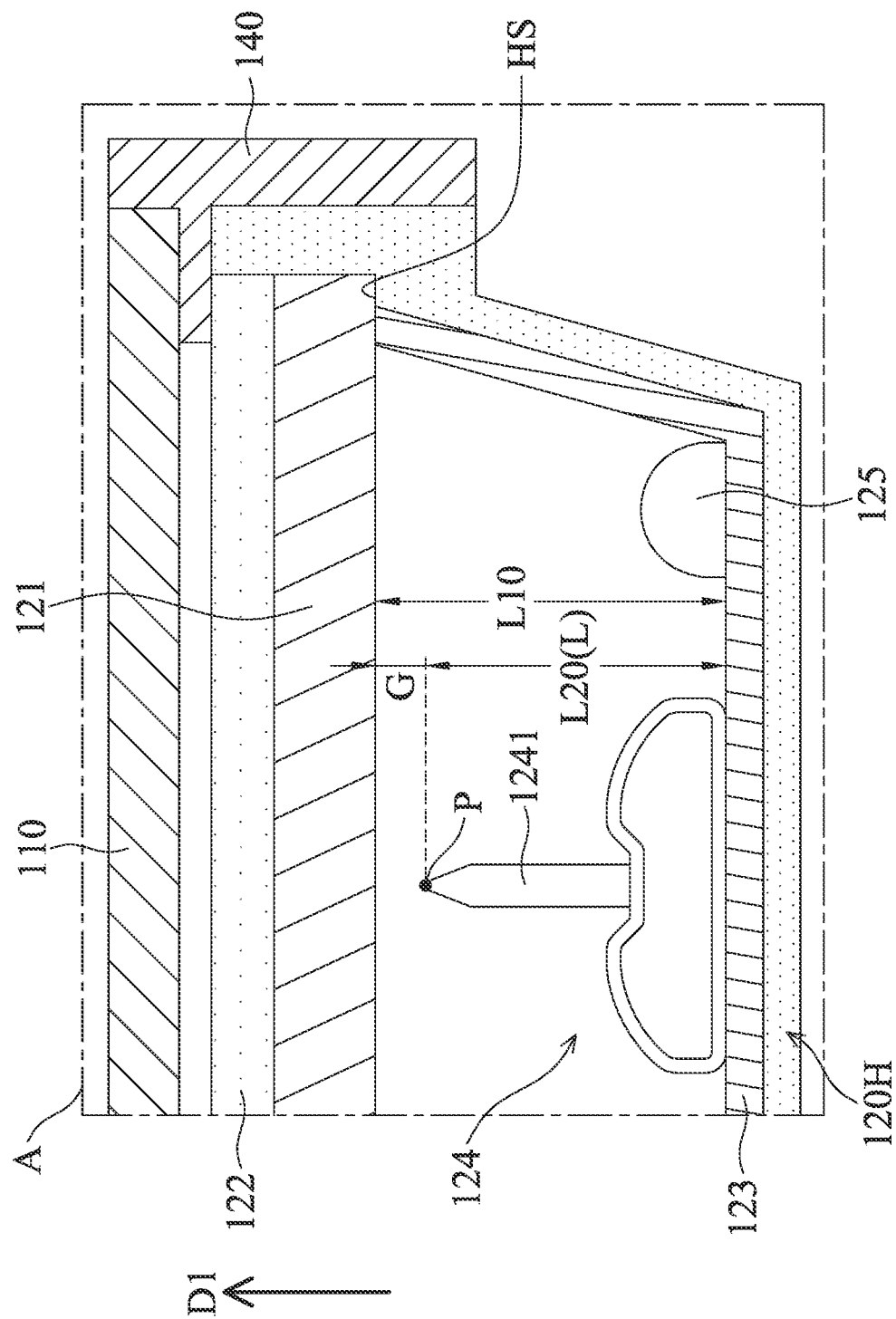
FIG. 5 is an enlarged schematic diagram of area A in FIG. 1, wherein a gap G is between the second optical film and the cushion element.

FIG. 5 shows the area A in FIG. 1, wherein a gap G between the cushion element 124 and the first optical film 121 is marked. Regarding the calculation of the gap G, in the normal direction D1 of the display panel 110, measure the shortest distance L10 from the first optical film 121 to the reflector 123, then measure the shortest distance L20 from the top P of the cushion element 124 to the reflector 123 (that is the total length L of the cushion element 124), and the two are subtracted, which is L10−L20=the width of the gap G. Another calculation method of the gap G may be, measure the shortest distance from the sustain portion HS of the rear casing 120H to the top P of the cushion element 124. In this way, the gap G also can be calculated and obtained.

Since the gap G is provided, in the normal direction D1 of the display panel 110, the total length L (equal to the shortest distance L20) of each cushion element 124 is less than the shortest distance L10 from the first optical film 121 to the reflector 123.

Regarding the gap G and the ultimate deformation distance of the cushion element 124, there is a buffer ratio can be defined as:

$$\text{buffer ratio} = \frac{\text{width of the gap}(G)}{(\text{width of the gap}(G) + \text{ultimated deformation distance}(D))} \quad (2)$$

In the formula (2), "the width of the gap" represents a distance, such as gap G, in the normal direction D1 of the display panel 110; and "ultimate deformation distance (D)" represents the maximum deformation distance of the cushion element 124 before being permanent deformed or broken as mentioned before. In some embodiments, the buffer ratio may be greater than or equal to 0, and less than or equal to 0.5 (such as 0≤buffer ratio≤0.5 or 0.2≤buffer ratio≤0.4). Especially, the buffer ratio may be greater than or equal to 0.01, and less than or equal to 0.3. With the forgoing ratio, the external force on the top P of the support portion 1241 can be reduced, so that the buffer ability can be effectively improved. If the buffer ratio is less than 0, the cushion element 124 may insert into the first optical film 121. If the buffer ratio is greater than 0.5, the width of the gap may be greater than the ultimate deformation distance (D), and the support ability of the cushion element 124 is decreased.

It should be noted that the features of the various embodiments can be combined and used as long as they do not violate or conflict the scope of the disclosure. For example, the cushion elements 124 to 124d may be provided in an embodiment. The backlight module 120 may have different numbers of optical films, such as one optical film, or three, four optical film disposed on the cushion elements 124.

In summary, an embodiment of the present disclosure provides a display device, including a display panel and a backlight module for providing a light passing through the display panel. The backlight module comprises a plurality of cushion elements, wherein at least portion of the plurality of cushion elements has a less deformation modulus than the display panel. The embodiment of the present disclosure may have at least one of the following advantages or effects. With the aforementioned cushion elements which have a less deformation modulus than the display panel, the support for the display panel is enhanced, and the situation of the permanent deformation or breakage of the cushion elements can be reduced, the quality of the device being improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the disclosure. It is intended that the standard and examples be considered as exemplary only, with the true scope of the disclosed embodiments being indicated by the following claims and their equivalents.

What is claimed is:

1. A display device, comprising:
a display panel; and
a backlight module for providing a light passing through the display panel, which comprises a plurality of cushion elements;
wherein at least one of the plurality of cushion elements has a support portion and a base portion, the support portion is connected to and disposed on the base portion, the support portion presents an elongated structure extending toward the display panel,
wherein the base portion includes:
two convex structures, respectively located on both sides of the support portion of the cushion element;
a connecting part, connecting the two convex structures; and
a bottom part, disposed opposite to the connecting part and connecting the two convex structures, wherein in a normal direction of the display panel, the location of a vertex of each convex structure is higher than the location of the connecting part.

2. The display device as claimed in claim 1, wherein a deformation modulus of each of the at least portion of the plurality of cushion elements is not higher than a half of that of the display panel.

3. The display device as claimed in claim 1, wherein the plurality of cushion elements each has a less deformation modulus than the display panel.

4. The display device as claimed in claim 3, wherein the deformation modulus of each of the plurality of cushion elements is not higher than a half of that of the display panel.

5. The display device as claimed in claim 1, wherein the plurality of cushion elements each has a deformation modulus not less than 0.5 kgf/mm and not higher than 8 kgf/mm.

6. The display device as claimed in claim 1, wherein the base portion has a hollow region.

7. The display device as claimed in claim 1, wherein in the normal direction of the display panel, the shortest distance from the vertex of each convex structure to a bottom part of the base portion is larger than the shortest distance from the connecting part to the bottom part.

8. The display device as claimed in claim 1, wherein the display panel includes two substrates, and the thickness of each of the two substrates is greater than or equal to 0.3 mm and less than or equal to 2 mm.

9. The display device as claimed in claim 1, wherein the thickness of the connecting part is larger than the thickness of each convex structure.

10. The display device as claimed in claim 1, wherein the support portion has a rounded corner on the top side of the support portion, and a width of the rounded corner is less than 0.5 mm.

11. The display device as claimed in claim 1, wherein in each of the convex structures, an angle between the convex structure and a bottom part of the base portion is greater than or equal to 30 degrees and less than or equal to 60 degrees.

12. The display device as claimed in claim 1,
wherein the support portion has a cone structure.

13. The display device as claimed in claim 1, wherein the backlight module comprises:
a rear casing, wherein the plurality of cushion elements are disposed on an inner surface a bottom shell of the rear casing; and
at least one optical film, disposed on a sustain portion of the rear casing, wherein the plurality of cushion elements is located between the rear casing and the at least one optical film.

14. The display device as claimed in claim 13, wherein there is a gap between the at least one optical film and each cushion element.

15. The display device as claimed in claim 14, wherein each cushion element has an ultimate deformation distance, and a buffer ratio is defined following:
- a width of the gap/(the width of the gap+the ultimate deformation distance)
- wherein: the buffer ratio is greater than or equal to 0 and less than or equal to 0.5.

16. The display device as claimed in claim 13, wherein the backlight module further comprises a reflector disposed on the rear casing.

17. The display device as claimed in claim 16, wherein the total length of each cushion element is defined as the distance from the top of the cushion element to the reflector,
- wherein in a normal direction of the display panel, the total length of each cushion element is less than the shortest distance from the at least one optical film to the reflector.

\* \* \* \* \*